Patented Jan. 17, 1928.

1,656,604

UNITED STATES PATENT OFFICE.

EDWIN M. PARTRIDGE, OF HAMMOND, INDIANA, AND ELWOOD W. SCARRITT, OF OAK PARK, ILLINOIS, ASSIGNORS TO PAIGE & JONES CHEMICAL CO. INC., OF NEW YORK, N. Y., A CORPORATION OF NEW YORK.

PROCESS OF PREPARING AN ARTIFICIAL BASE EXCHANGE SUBSTANCE AND THE PRODUCT THEREOF.

No Drawing. Application filed December 8, 1925. Serial No. 74,159.

Our invention relates to substances which are adapted for the purification of water and other purposes where the desired effect can be obtained by the exchange of bases. For a number of years, artificial zeolites or base exchange materials obtained by mixing solutions of salts of amphoteric metals with alkali silicate solutions, have been used for such purposes. An amphoteric metal is one the hydroxid of which can, according to conditions, function either as an acid or as a base. The products of this character employed hitherto have been unsatisfactory on account of their relatively low density and poor physical stability. Material of low density is objectionable because it necessitates allowing a large freeboard space into which the purifying mineral may rise without being washed out when water is made to flow upwardly through a container holding such mineral. Poor physical stability is undesirable because the breaking of the grains of the material entails the loss of fine particles from the purifying bed, and the presence of a considerable amount of such fine material increases the resistance to the flow of water through the bed.

The object of our present invention is to produce an artificial base-exchange substance of high density and great stability.

We are aware of certain prior procedures according to which a solution of sodium silicate has been mixed with aluminum sulfate or other salts of amphoteric metals. We have found that far superior results are obtained by mixing in salts capable of producing insoluble precipitates in the presence of each other and by having these salts present at the time the base-exchange substance is formed. The resulting improved base-exchange substance is distinguished by high density and great physical strength. The added salts selected are preferably such as can be mixed individually with the sodium silicate or other reacting solutions without the formation of any precipitate before the final mixing of the two main solutions. For instance, if we desire to use as main solutions, solutions of sodium silicate and aluminum sulfate, we may add a proper proportion of tri-sodium phosphate to the sodium silicate without the formation of any precipitate, and mix separately a proper amount of magnesium sulfate with the aluminum sulfate solution, likewise without the formation of any precipitate. In the presence of each other, however, magnesium sulfate and trisodium phosphate are capable of precipitating insoluble magnesium phosphate. When the mixture of sodium silicate and tri-sodium phosphate solutions is brought together with the mixture of aluminum sulfate and magnesium sulfate solutions, a gel is formed which upon drying at a relatively low temperature (below 95 degrees C.) will yield a hard, dense substance of great durability and marked exchange capacity. By this procedure we obtain a base exchange zeolite with an apparent density of from 60 to 65 pounds per cubic foot. The great strength of this material is indicated by the fact that it cannot be crushed between the fingers.

As an example of the manner in which our invention may be carried out in detail, the following may be given:

Fifty-four pounds and two ounces of commercial 40 degree Bé. sodium silicate containing about 8.8% of sodium oxide and 28.2% of silica, are mixed with ten pounds and four ounces of tri-sodium phosphate dissolved in enough water to bring the total volume to 27½ gallons; this mixture we shall call solution A. Twenty pounds and two ounces of aluminum sulfate and four pounds and two ounces of magnesium sulfate are dissolved in enough water to bring the total volume to 27½ gallons; this mixture we shall term solution B. Equal volumes of solutions A and B are then stirred together. Within fifteen minutes there is formed a gel which is dried at a low temperature (preferably not over 95 degrees C.) and then washed. The product is neutral, that is, not alkaline to phenolphthalein.

The procedure above may be varied considerably without departing from the nature of our invention as defined in the appended claims. For instance, instead of tri-sodium phosphate, we may employ disodium phosphate, in which case, however, the sodium oxide content of the sodium silicate would have to be higher than when the sodium silicate is used in conjunction with trisodium phosphate. Instead of magnesium sulfate, we could use other soluble magnesium salts, or soluble zinc or copper salts.

Of course, even when employing the same substances as in the example, certain alterations are permissible, for instance in the proportions employed. The procedure could be modified by making the solutions of unequal concentration and mixing unequal volumes of the two solutions, or di-sodium phosphate could be substituted for tri-sodium phosphate, in which case, however, we should either employ a sodium silicate having a higher content of sodium oxide or we should add less aluminum sulphate.

The essential principle of our invention is the precipitation and formation of an insoluble salt simultaneously and together with the formation of a gel from the mixture of solutions of sodium silicate and aluminum sulfate, and drying the latter at a low temperature.

We claim as our invention:

1. The process which consists in preparing a wet mixture of sodium silicate and tri-sodium phosphate, separately preparing a wet mixture of aluminum sulfate and magnesium sulfate, combining the two mixtures to precipitate insoluble magnesium phosphate and to form a gel, and drying the latter at a relatively low temperature.

2. The process which consists in preparing a wet mixture of sodium silicate and a sodium phosphate, separately preparing a wet mixture of aluminum sulfate and a soluble salt of a metal the phosphate of which is insoluble, bringing the two mixtures together to precipitate an insoluble phosphate of said metal and simultaneously form a gel, and drying the latter at a relatively low temperature.

3. A base-exchange substance obtained by drying a gel resulting from the reaction between a solution of sodium silicate and tri-sodium phosphate and a solution of aluminum sulfate and magnesium sulfate, said substance being neutral to phenolphthalein, non-friable and distinguished by a density sufficiently high to make it weigh at least 60 pounds per cubic foot.

In testimony whereof we have hereunto set our hands.

EDWIN M. PARTRIDGE.
ELWOOD W. SCARRITT.